(12) United States Patent
Mitchell

(10) Patent No.: US 10,274,238 B2
(45) Date of Patent: Apr. 30, 2019

(54) DRAINLESS ICEMAKER APPLIANCE

(71) Applicant: Haier US Appliance Solutions, Inc., Wilmington, DE (US)

(72) Inventor: Alan Joseph Mitchell, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 22 days.

(21) Appl. No.: 15/633,959

(22) Filed: Jun. 27, 2017

(65) Prior Publication Data

US 2018/0372388 A1 Dec. 27, 2018

(51) Int. Cl.
*C02F 1/00* (2006.01)
*C02F 1/42* (2006.01)
(Continued)

(52) U.S. Cl.
CPC .............. *F25C 1/18* (2013.01); *B01D 15/363* (2013.01); *B01D 29/60* (2013.01); *B01D 29/605* (2013.01); *B01D 35/1435* (2013.01); *C02F 1/003* (2013.01); *C02F 2001/422* (2013.01); *C02F 2201/006* (2013.01); *C02F 2209/10* (2013.01); *C02F 2209/42* (2013.01); *F25C 2400/14* (2013.01); *F25C 2600/04* (2013.01); *F25C 2700/04* (2013.01)

(58) Field of Classification Search
CPC .... B01D 15/363; B01D 29/60; B01D 29/605; B01D 35/1435; C02F 1/003; C02F 2001/422; C02F 2201/006; C02F 2209/10; C02F 2209/42; F25C 1/18; F25C 2400/14; F25C 2600/04; F25C 2700/04; F25D 21/14; F25D 2321/00; F25D 2321/14

See application file for complete search history.

(56) References Cited

U.S. PATENT DOCUMENTS 3,657,899 A * 4/1972 Hosoda ...................... F25C 1/12
137/392
7,476,312 B2 * 1/2009 Laing ...................... B01D 61/08
210/109

(Continued)

FOREIGN PATENT DOCUMENTS

EP 1798501 A1 * 6/2007 ................ F25C 1/08
JP 2001289542 A 10/2001
(Continued)

OTHER PUBLICATIONS

Nordacque webpage and Atlas FILTRI, housing and cartidges SX series with standard flat seals.*

(Continued)

*Primary Examiner* — Edward F Landrum
*Assistant Examiner* — Chang H. Park
(74) *Attorney, Agent, or Firm* — Dority & Manning, P.A.

(57) ABSTRACT

An icemaker appliance includes an ice maker positioned within a cabinet. A circulation conduit extends from a sump to the ice maker. A pump is connected to the circulation conduit such that the pump is operable to flow liquid water from the sump to the ice maker through the circulation conduit. A deionization filter assembly is coupled to the circulation conduit. A sensor is operable to measure a total dissolved solids value of the liquid water flowing through the circulation conduit.

16 Claims, 3 Drawing Sheets

(51) Int. Cl.
*F25C 1/18* (2006.01)
*B01D 15/36* (2006.01)
*B01D 29/60* (2006.01)
*B01D 35/143* (2006.01)

(56) References Cited

U.S. PATENT DOCUMENTS 9,303,903 B2 4/2016 Boarman et al.
2003/0010054 A1* 1/2003 Esch .................... A47F 3/0439
62/354

FOREIGN PATENT DOCUMENTS

| JP | 3665260 B2 | 6/2007 |
| JP | 4400068 B2 | 1/2010 |
| KR | 101281592 B1 * | 7/2013 |
| WO | WO2007068506 A1 | 6/2007 |
| WO | WO2008061179 A2 | 5/2008 |

OTHER PUBLICATIONS

GE Water & Process Technologies, Chapter 08—Ion Exchange, Jul. 6, 2008.*

* cited by examiner

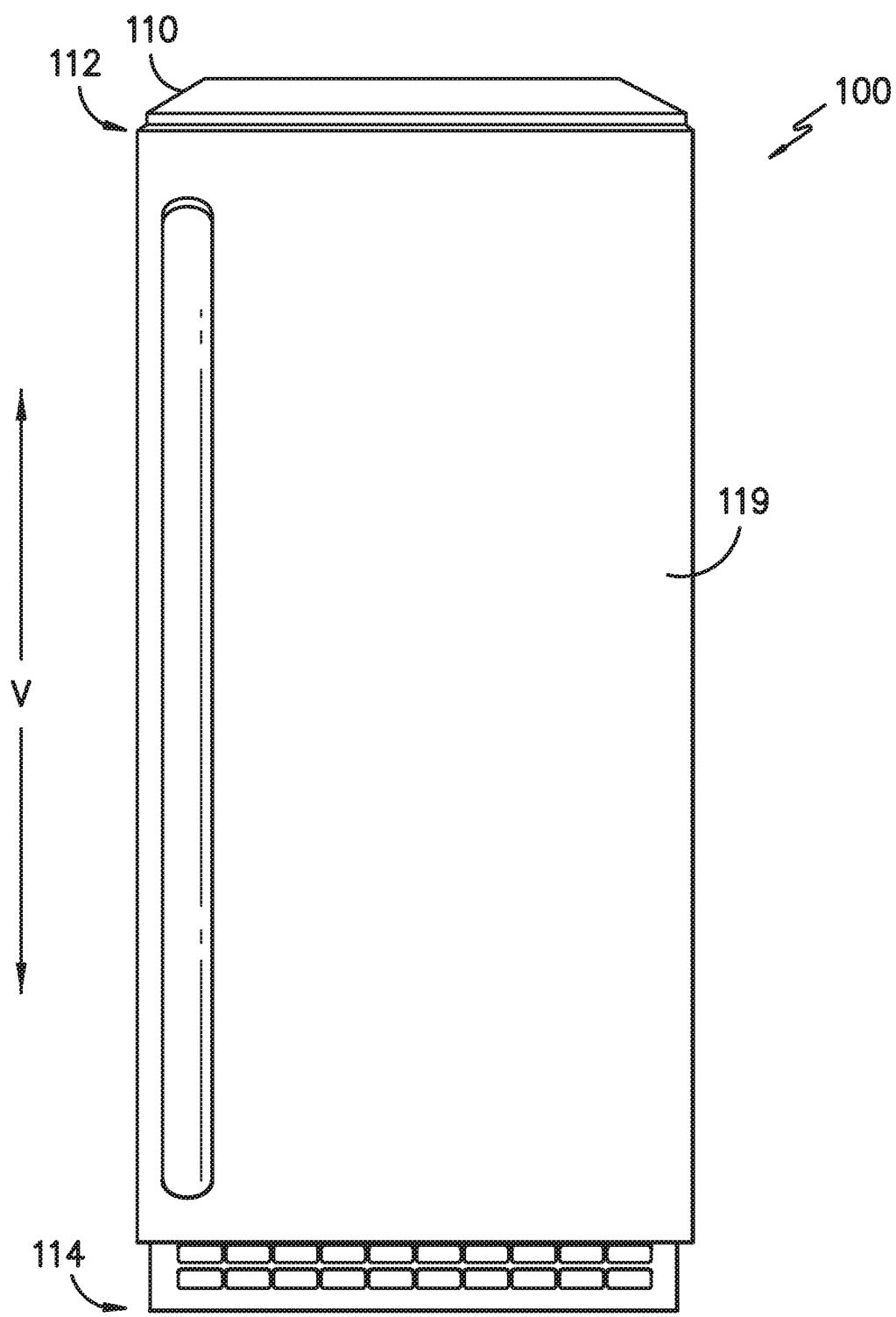
FIG. -1-

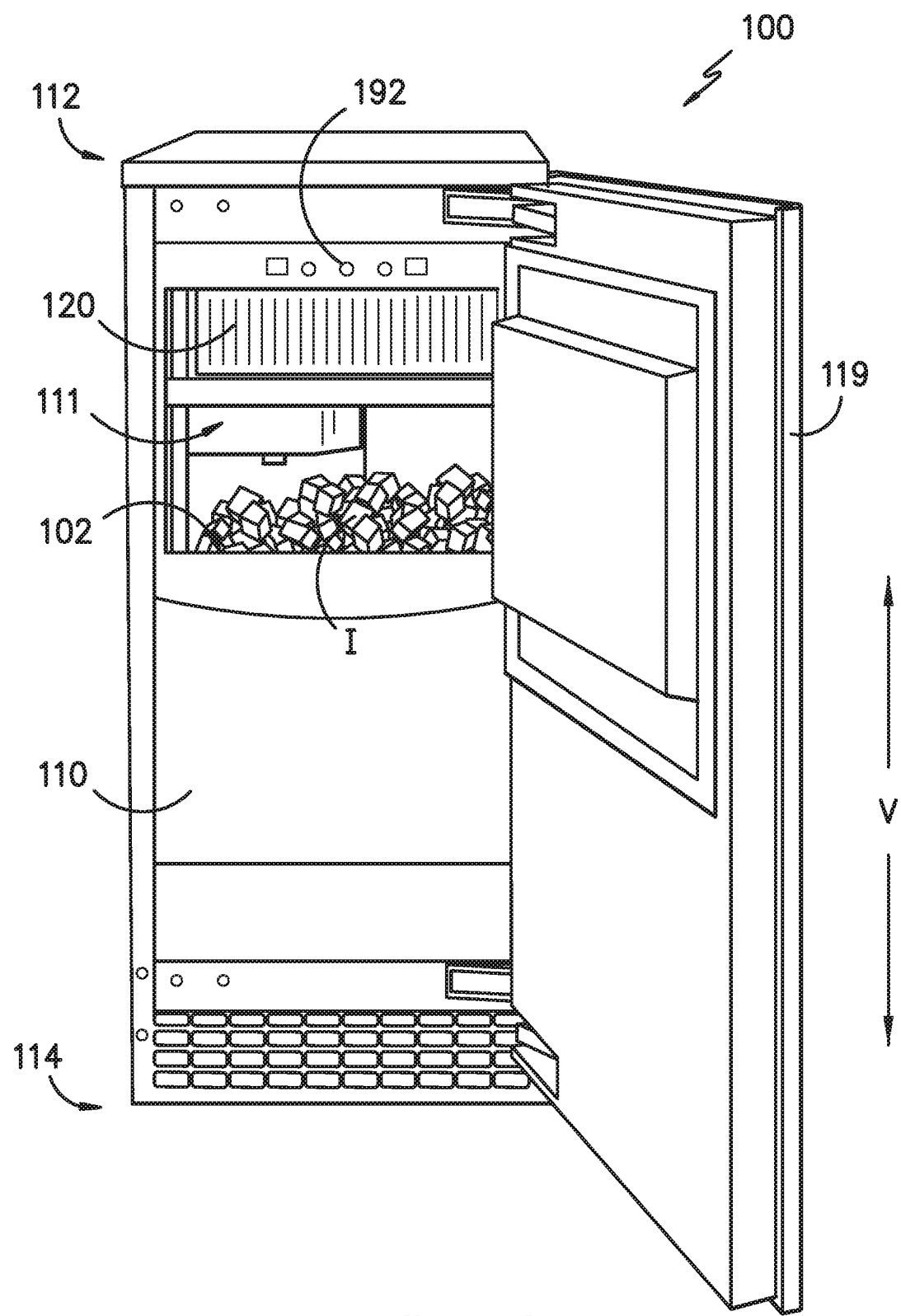
FIG. -2-

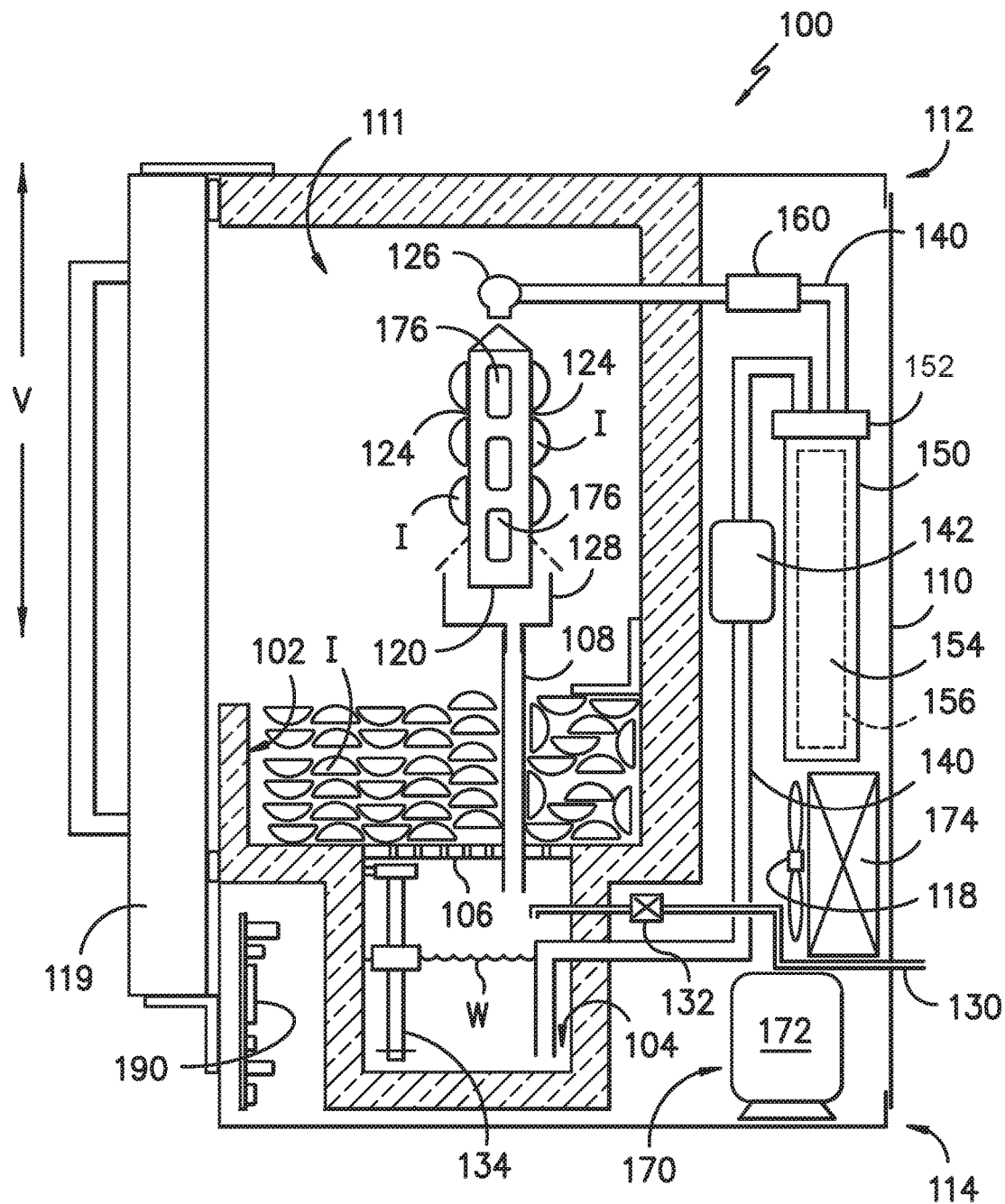
FIG. -3-

DRAINLESS ICEMAKER APPLIANCE

FIELD OF THE INVENTION

The present subject matter relates generally to icemaker appliances.

BACKGROUND OF THE INVENTION

Icemaker appliances generally include an ice maker that is configured to generate ice. Ice makers within icemaker appliances are plumbed to a water supply, and water from the water supply may flow to the ice maker within the icemaker appliances. Icemaker appliances are frequently cooled by a sealed system, and heat transfer between liquid water in the ice maker and refrigerant of the sealed system generates ice.

In certain icemaker appliances, stored ice within the icemaker appliances melts over time and generates liquid meltwater, and the icemaker appliances are plumbed to an external drain to dispose of the liquid meltwater. While effective for managing the liquid meltwater, external drain lines have drawbacks. For example, external drain lines can be expensive to install. In addition, external drain lines can be difficult to install in certain locations.

Accordingly, an icemaker appliance with features for operating without an external drain line would be useful.

BRIEF DESCRIPTION OF THE INVENTION

The present subject matter provides an icemaker appliance with an ice maker positioned within a cabinet. A circulation conduit extends from a sump to the ice maker. A pump is connected to the circulation conduit such that the pump is operable to flow liquid water from the sump to the ice maker through the circulation conduit. A deionization filter assembly is coupled to the circulation conduit. A sensor is operable to measure a total dissolved solids value of the liquid water flowing through the circulation conduit. Additional aspects and advantages of the invention will be set forth in part in the following description, or may be apparent from the description, or may be learned through practice of the invention.

In a first example embodiment, an icemaker appliance is provided. The icemaker appliance includes a cabinet that has an ice storage compartment and a sump. The sump positioned is below the ice storage compartment within the cabinet. An ice maker is positioned within the cabinet and operable to form clear ice. The ice storage compartment is positioned for receiving the clear ice from the ice maker. A circulation conduit extends from the sump to the ice maker. A pump is connected to the circulation conduit such that the pump is operable to flow liquid water from the sump to the ice maker through the circulation conduit. A deionization filter assembly is coupled to the circulation conduit. The deionization filter assembly is configured for filtering the liquid water flowing through the circulation conduit during operation of the pump to reduce a total dissolved solids value of the liquid water. A sensor is positioned at the circulation conduit. The sensor is operable to measure the total dissolved solids value of the liquid water flowing through the circulation conduit.

In a second example embodiment, an icemaker appliance is provided. The icemaker appliance includes a cabinet that has an ice storage compartment and a sump. An ice maker is positioned within the cabinet and is operable to form clear ice. The ice storage compartment is positioned for receiving the clear ice from the ice maker. A circulation conduit extends from the sump to the ice maker. A pump is connected to the circulation conduit such that the pump is operable to flow liquid water from the sump to the ice maker through the circulation conduit. A deionization filter assembly is coupled to the circulation conduit. The deionization filter assembly is configured for filtering the liquid water flowing through the circulation conduit during operation of the pump to reduce a total dissolved solids value of the liquid water. A sensor is positioned at the circulation conduit. The sensor is operable to measure the total dissolved solids value of the liquid water flowing through the circulation conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front, perspective view of an icemaker appliance according to an example embodiment of the present subject matter.

FIG. 2 provides a front, perspective view of the example icemaker appliance of FIG. 1 with a door of the example icemaker appliance shown in an open position.

FIG. 3 provides a side, schematic view of certain components of the example icemaker appliance of FIG. 1.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 provide front, perspective views of an icemaker appliance 100 according to an example embodiment of the present subject matter. As discussed in greater detail below, icemaker appliance 100 includes features for generating or producing clear ice. Thus, a user of icemaker appliance 100 may consume clear ice stored within icemaker appliance 100. As may be seen in FIG. 1, icemaker appliance 100 defines a vertical direction V.

Icemaker appliance 100 includes a cabinet 110. Cabinet 110 may be insulated in order to limit heat transfer between an interior volume 111 (FIG. 2) of cabinet 110 and ambient atmosphere. Cabinet 110 extends between a top portion 112 and a bottom portion 114, e.g., along the vertical direction V. Thus, top and bottom portions 112, 114 of cabinet 110 are spaced apart from each other, e.g., along the vertical direction V. A door 119 is mounted to cabinet 110 at a front portion of cabinet 110. Door 119 permits selective access to interior volume 111 of cabinet 110. For example, door 119 is shown in a closed position in FIG. 1, and door 119 is shown in an open position in FIG. 2. A user may rotate door between the open and closed positions to access interior volume 111 of cabinet 110.

As may be seen in FIG. 2, various components of icemaker appliance 100 are positioned within interior volume 111 of cabinet 110. In particular, icemaker appliance 100 includes an ice maker 120 disposed within interior volume 111 of cabinet 110, e.g., at top portion 112 of cabinet 110. Ice maker 120 is configured for producing clear ice I. Ice maker 120 may be configured for making any suitable type of clear ice. Thus, e.g., ice maker 120 may be a clear cube ice maker, such as the ice maker described in U.S. Pat. No. 5,212,957 entitled "Refrigerator/Water Purifier" which is incorporated by reference herein in its entirety.

Icemaker assembly 100 also includes an ice storage compartment or storage bin 102. Storage bin 102 is disposed within interior volume 111 of cabinet 110. In particular, storage bin 102 may be positioned, e.g., directly, below ice maker 120 along the vertical direction V. Thus, storage bin 102 is positioned for receiving clear ice I from ice maker 120 and is configured for storing the clear ice I therein. It will be understood that storage bin 102 may be maintained at a temperature greater than the freezing point of water. Thus, the clear ice I within storage bin 102 melts over time while stored within storage bin 102. As discussed in greater detail below, icemaker appliance 100 includes features for recirculating liquid meltwater from storage bin 102 to ice maker 120.

FIG. 3 provides a schematic view of certain components of icemaker appliance 100. As may be seen in FIG. 3, ice maker 120 includes a pair of plates 124 and a nozzle 126. Liquid water from nozzle 126 may flow across plates 124. As discussed in greater detail below, plates 124 are cooled by refrigerant at a back surface of plates 124. Thus, the liquid water from nozzle 126 flowing across plates 124 may freeze on plates 124, e.g., in order to form clear crescent ice cubes on plates 124.

To cool plates 124, icemaker assembly 100 includes a sealed system 170. Sealed system 170 includes components for executing a known vapor compression cycle for cooling ice maker 120 and/or air. The components include a compressor 172, a condenser 174, an expansion device (not shown), and an evaporator 176 connected in series and charged with a refrigerant. As will be understood by those skilled in the art, sealed system 170 may include additional components, e.g., at least one additional evaporator, compressor, expansion device, and/or condenser. Thus, sealed system 170 is provided by way of example only. It is within the scope of the present subject matter for other configurations of a sealed system to be used as well.

Within sealed system 170, refrigerant flows into compressor 172, which operates to increase the pressure of the refrigerant. This compression of the refrigerant raises its temperature, which is lowered by passing the refrigerant through condenser 174. Within condenser 174, heat exchange with ambient air takes place so as to cool the refrigerant. A fan 118 may operate to pull air across condenser 174 so as to provide forced convection for a more rapid and efficient heat exchange between the refrigerant within condenser 174 and the ambient air.

The expansion device (e.g., a valve, capillary tube, or other restriction device) receives refrigerant from condenser 174. From the expansion device, the refrigerant enters evaporator 176. Upon exiting the expansion device and entering evaporator 176, the refrigerant drops in pressure. Due to the pressure drop and/or phase change of the refrigerant, evaporator 176 is cool, e.g., relative to ambient air and/or liquid water. Evaporator 176 is positioned at and in thermal contact with ice maker 120, e.g., between plates 124 of ice maker 120. Thus, ice maker 120 may be directly cooled with refrigerant at evaporator 176.

It should be understood that first ice maker 120 may be an air cooled ice maker in alternative example embodiments. Thus, e.g., cooled air from evaporator 176 may refrigerate various components of icemaker appliance 100, such as plates 124 of ice maker 120. In such example embodiments, evaporator 176 is a type of heat exchanger which transfers heat from air passing over evaporator 176 to refrigerant flowing through evaporator 176, and fan may circulate chilled air from the evaporator 176 to ice maker 120.

Icemaker appliance 100 also includes a controller 190 that regulates or operates various components of icemaker appliance 100. Controller 190 may include a memory and one or more microprocessors, CPUs or the like, such as general or special purpose microprocessors operable to execute programming instructions or micro-control code associated with operation of icemaker appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 190 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Input/output ("I/O") signals may be routed between controller 190 and various operational components of icemaker appliance 100. As an example, the various operational components of icemaker appliance 100 may be in communication with controller 190 via one or more signal lines or shared communication busses.

As discussed above, the clear ice I within storage bin 102 melts over time while stored within storage bin 102. As may be seen in FIG. 3, icemaker appliance 100 includes a sump 104. Sump 104 is positioned below storage bin 102, e.g., along the vertical direction V, within cabinet 110. Thus, liquid meltwater from the clear ice I in storage bin 102 may flow downwardly, e.g., along the vertical direction V within cabinet 110, from storage bin 102 into sump 104. The liquid meltwater may collect and be stored within sump 104. In addition, the liquid meltwater in sump 104 may be recirculated to ice maker 120, as discussed in greater detail below.

As may be seen in FIG. 3, icemaker appliance 100 may include a water supply conduit 130 and a supply valve 132. Water supply conduit 130 is connectable to an external pressurized water supply, such as a municipal water supply or well. Supply valve 132 is coupled to water supply conduit 130, and supply valve 132 is operable (e.g., openable and closable) to regulate liquid water flow through water supply conduit 130 into sump 104. Thus, e.g., sump 104 may be filled with fresh liquid water from the external pressurized water supply through water supply conduit 130 by opening supply valve 132. In particular, icemaker appliance 100 may include a water level sensor 134, e.g., positioned at or within sump 104. Water level sensor 134 is operable to measure or determine a level or height of liquid water W within sump 104. Water level sensor 134 may be a float sensor, optical sensor, resistance sensor, or any other suitable sensor for measuring or determining the level or height of liquid water W within sump 104. Controller 190 is in operative communication with supply valve 132 and water level sensor 134, and controller 190 may open supply valve 132 in response to the water level W within sump 104 measured with water level sensor 134 falling below a threshold level, e.g., half full, a quarter full, etc. Thus, e.g., sump 104 may be filled with fresh liquid water from the external pressurized water supply through water supply conduit 130 by opening supply valve 132 when the water level W within sump 104 measured with water level sensor 134 falls below the threshold level.

A perforated plate 106 may be positioned between storage bin 102 and sump 104. Perforated plate 106 may form or be a portion of storage bin 102, and the clear ice I within storage bin 102 may rest or be supported on perforated plate 106. Meltwater from the clear ice I in storage bin 102 is flowable through perforated plate 106 to sump 104. Thus, hole(s) in perforated plate 106 may provide fluid communication between storage bin 102 and sump 104 such that the meltwater from the clear ice I in storage bin 102 is flowable into sump 104.

Icemaker appliance 100 may also include a reservoir 128 and a runoff conduit 108. Reservoir 128 is positioned below ice maker 120 for collecting runoff liquid water from ice maker 120. Thus, reservoir 128 may be positioned directly below plates 124 such that runoff liquid water, e.g., excess liquid water from nozzle 126 that does not freeze onto plates 124, flows into reservoir 128 rather than sump 104. Reservoir 128 may be positioned between ice maker 120 and sump 104 and/or storage bin 102, e.g., along the vertical direction V. Runoff conduit 108 extends from reservoir 128 to sump 104, e.g., through perforated plate 106. Thus, the runoff liquid water collected from ice maker 120 within reservoir 128 is flowable from reservoir 128 to sump 104 through runoff conduit 108. In such a manner, the runoff liquid water may pass through storage bin 102 without contacting or flowing directly over the clear ice I within storage bin 102. A storage time of the clear ice I within storage bin 102 may be improved by flowing the runoff liquid water from reservoir 128 through runoff conduit 108, e.g., relative to example embodiments where the runoff liquid water flows directly through storage bin 102 such that the runoff liquid water contacts and flows directly over the clear ice I.

Within sump 104, the runoff liquid water from reservoir 128 may combine or mix with the liquid meltwater from storage bin 102 and be recirculated to ice maker 120. Thus, the runoff liquid water from reservoir 128 and the liquid meltwater from storage bin 102 may be recirculated to ice maker 120. In particular, as may be seen in FIG. 3, icemaker appliance 100 includes a circulation conduit 140 and a pump 142. Circulation conduit 140 extends from sump 104 to ice maker 120, e.g., such that an inlet of circulation conduit 140 is positioned at sump 104 and an outlet of circulation conduit 140 is positioned at ice maker 120. Thus, liquid water in sump 104 is flowable to ice maker 120 within cabinet 110 through circulation conduit 140. In particular, pump 142 is connected to circulation conduit 140 such that pump 142 is operable to flow the liquid water from sump 104 to ice maker 120 through circulation conduit 140. Controller 190 is in operative communication with pump 142, e.g., such that controller 190 may selectively activate and deactivate pump 142. Thus, controller 190 may operate pump 142 to recirculate the liquid water in sump 104 to ice maker 120 through circulation conduit 140.

As noted above, ice maker 120 utilizes the runoff liquid water from reservoir 128 and the liquid meltwater from storage bin 102 to form clear ice I. It will be understood that, during operation of ice maker 120, mineral impurities build up in the liquid water in sump 104 such that a total dissolved solids value of the liquid water in sump 104 increases over time. In particular, as the liquid water recirculates over plates 124 many times, each pass increases the total dissolved solids value of the liquid water in sump 104. Icemaker appliance 100 includes features for reducing the total dissolved solids value of the liquid water in sump 104, e.g., to avoid producing cloudy ice with ice maker 120.

As may be seen in FIG. 3, icemaker appliance 100 includes a deionization filter assembly 150. Deionization filter assembly 150 is coupled to circulation conduit 140 such that the liquid water from sump 104 flows through deionization filter assembly 150 during operation of pump 142. Deionization filter assembly 150 is configured for filtering the liquid water flowing through circulation conduit 140 during operation of pump 142 to reduce the total dissolved solids value of the liquid water. Thus, deionization filter assembly 150 may remove dissolved solids from the liquid water flowing through circulation conduit 140 during operation of pump 142. By filtering the liquid water flowing through circulation conduit 140 with deionization filter assembly 150, icemaker appliance 100 does not require a drain line to remove mineral impurities from the liquid water in sump 104, e.g., a drain line from sump 104 out of cabinet 110. Thus, icemaker appliance 100 may be installed in areas without drain lines and/or without the added expense of adding a drain line. In addition, performance of evaporator 176 may be improved by removing mineral impurities from the liquid water in sump 104, e.g., due to evaporator 176 requiring less cleaning.

Deionization filter assembly 150 may include a manifold 152 and a filter cartridge 154. Manifold 152 is mounted to circulation conduit 140, and filter cartridge 154 is mountable to manifold 152. Thus, filter cartridge 154 may be replaced or serviced, e.g. when a filtering capacity of a filter medium 156 within filter cartridge 154 is exceeded, by removing filter cartridge 154 from manifold 152. Filter medium 156 may be any suitable type of filter medium for reducing the total dissolved solids value of the liquid water in circulation conduit 140. For example, filter medium 156 may be a twin bed filter medium with a weak base anion ion exchange resin. The weak base anion ion exchange resin may have a reduced amine odor relative to a strong base anion ion exchange resin.

A sensor 160 is positioned at circulation conduit 140, e.g., downstream of deionization filter assembly 150 relative to a flow of liquid water in circulation conduit 140. Sensor 160 is operable to measure the total dissolved solids value of the liquid water flowing through circulation conduit 140. Sensor 160 may be any suitable type of sensor for measuring the total dissolved solids value of the liquid water flowing through circulation conduit 140. For example, sensor 160 may be an electrical conductivity meter or a TDS meter. Controller 190 is in operative communication with pump 142 and sensor 160. Controller 190 may deactivate pump 142 in response to the total dissolved solids value of the liquid water flowing through circulation conduit 140 measured with sensor 160 exceeding a threshold value. It will be understood that filter medium 156 loses efficacy over time. Sensor 160 may monitor the efficacy of filter medium 156 by measuring the total dissolved solids value of the liquid water flowing through circulation conduit 140. When the total dissolved solids value of the liquid water flowing through circulation conduit 140 measured with sensor 160 exceeds the threshold value, the filtering capacity of a filter medium 156 may be met or exceeded, and filter cartridge 154 may require servicing and/or replacement. Controller 190 may deactivate pump 142 to terminate water flow to ice maker 120 and thereby avoid producing cloudy ice, e.g., until filter cartridge 154 is serviced and/or replaced. By using sensor 160, filter cartridge 154 may be serviced and/or replaced only as needed. In certain example embodiments, filter cartridge 154 may filter a volume of liquid water sufficient to form three hundred pounds (300 lbs.) of clear ice I before requiring servicing and/or replacement.

Icemaker appliance 100 may also include a user interface panel 192 (FIG. 2), such as a touch pad, buttons, knobs, etc. Controller 190 is in operative communication with user interface panel 192. Controller 190 may activate a replace filter cartridge alert on user interface panel 192 in response to the total dissolved solids value of the liquid water flowing through circulation conduit 140 measured with sensor 160 exceeding the threshold value. The replace filter cartridge alert may be any suitable type of alert. For example, the replace filter cartridge alert may be an audible alarm, a visual alarm, etc. Thus, controller 190 may activate a speaker or light emitter on user interface panel 192 to alert a user to replace and/or service filter cartridge 154.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An icemaker appliance, comprising:
   a cabinet having an ice storage compartment and a sump, the sump positioned below the ice storage compartment within the cabinet;
   an ice maker positioned within the cabinet and operable to form clear ice, the ice storage compartment positioned for receiving the clear ice from the ice maker;
   a perforated plate positioned between the ice storage compartment and the sump, meltwater from the clear ice in the ice storage compartment flowable through the perforated plate to the sump;
   a reservoir positioned below the ice maker for collecting runoff liquid water from the ice maker;
   a run off conduit extending from the reservoir to the sump through the perforated plate such that the runoff liquid water is flowable from the reservoir to the sump through the runoff conduit;
   a circulation conduit extending from the sump to the ice maker;
   a pump connected to the circulation conduit such that the pump is operable to flow liquid water from the sump to the ice maker through the circulation conduit;
   a deionization filter assembly coupled to the circulation conduit, the deionization filter assembly configured for filtering the liquid water flowing through the circulation conduit during operation of the pump to reduce a total dissolved solids value of the liquid water; and
   a sensor positioned at the circulation conduit, the sensor operable to measure the total dissolved solids value of the liquid water flowing through the circulation conduit.

2. The icemaker appliance of claim 1, wherein the deionization filter assembly comprises a manifold mounted to the circulation conduit and a filter cartridge mountable to the manifold, the filter cartridge having a filter medium for filtering the liquid water.

3. The icemaker appliance of claim 2, wherein the filter medium comprises a twin bed filter medium with a weak base anion ion exchange resin.

4. The icemaker appliance of claim 1, further comprising a controller in operative communication with the pump and the sensor, the controller configured to deactivate the pump in response to the total dissolved solids value of the liquid water flowing through the circulation conduit measured with the sensor exceeding a threshold value.

5. The icemaker appliance of claim 4, further comprising a user interface panel, the controller in operative communication with the user interface panel, the controller further configured to activate a replace filter cartridge alert on the user interface panel in response to the total dissolved solids value of the liquid water flowing through the circulation conduit measured with the sensor exceeding the threshold value.

6. The icemaker appliance of claim 1, further comprising a water supply conduit and a supply valve, the water supply conduit connectable to an external water supply, the supply valve coupled to the water supply conduit and operable to regulate liquid water flow through the water supply conduit into the sump.

7. The icemaker appliance of claim 6, further comprising a controller and a water level sensor, the controller in operative communication with the supply valve and the water level sensor, the water level sensor positioned within the sump, the controller operable to open the supply valve in response to a water level within the sump measured with the water level sensor failing below a threshold level.

8. The icemaker appliance of claim 1, further comprising a sealed system having an evaporator positioned at the ice maker, the sealed system operable to cool the ice maker.

9. The icemaker appliance of claim 1, wherein the icemaker appliance does not have a drain line from the sump out of the cabinet.

10. An icemaker appliance, comprising:
    a cabinet having an ice storage compartment and a sump;
    an ice maker positioned within the cabinet and operable to form clear ice, the ice storage compartment positioned for receiving the clear ice from the ice maker;
    a perforated plate positioned between the ice storage compartment and the sump, meltwater from the clear ice in the ice storage compartment flowable through the perforated plate to the sump;
    a reservoir positioned below the ice maker for collecting runoff liquid water from the ice maker;
    a run off conduit extending from the reservoir to the sump through the perforated plate such that the runoff liquid water is flowable from the reservoir to the sump through the runoff conduit;
    a circulation conduit extending from the sump to the ice maker;
    a pump connected to the circulation conduit such that the pump is operable to flow liquid water from the sump to the ice maker through the circulation conduit;
    a deionization filter assembly coupled to the circulation conduit, the deionization filter assembly configured for filtering the liquid water flowing through the circulation conduit during operation of the pump to reduce a total dissolved solids value of the liquid water; and a sensor positioned at the circulation conduit, the sensor operable to measure the total dissolved solids value of the liquid water flowing through the circulation conduit.

11. The icemaker appliance of claim 10, wherein the deionization filter assembly comprises a manifold mounted to the circulation conduit and a filter cartridge mountable to the manifold, the filter cartridge having a twin bed filter medium with a weak base anion ion exchange resin.

12. The icemaker appliance of claim 10, further comprising a controller in operative communication with the pump and the sensor, the controller configured to deactivate the pump in response to the total dissolved solids value of the liquid water flowing through the circulation conduit measured with the sensor exceeding a threshold value.

13. The icemaker appliance of claim 12, further comprising a user interface panel, the controller in operative communication with the user interface panel, the controller further configured to activate a replace filter cartridge alert on the user interface panel in response to the total dissolved solids value of the liquid water flowing through the circulation conduit measured with the sensor exceeding the threshold value.

14. The icemaker appliance of claim 10, further comprising a water supply conduit and a supply valve, the water supply conduit connectable to an external water supply, the supply valve coupled to the water supply conduit and operable to regulate liquid water flow through the water supply conduit into the sump.

15. The icemaker appliance of claim 14, further comprising a controller and a water level sensor, the controller in operative communication with the supply valve and the water level sensor, the water level sensor positioned within the sump, the controller operable to open the supply valve in response to a water level within the sump measured with the water level sensor falling below a threshold level.

16. The icemaker appliance of claim 10, wherein the icemaker appliance does not have a drain line from the sump out of the cabinet.

* * * * *